F. E. KIP.
PHOTOGRAPH HOLDER.
APPLICATION FILED AUG. 5, 1910.
1,024,583.
Patented Apr. 30, 1912.
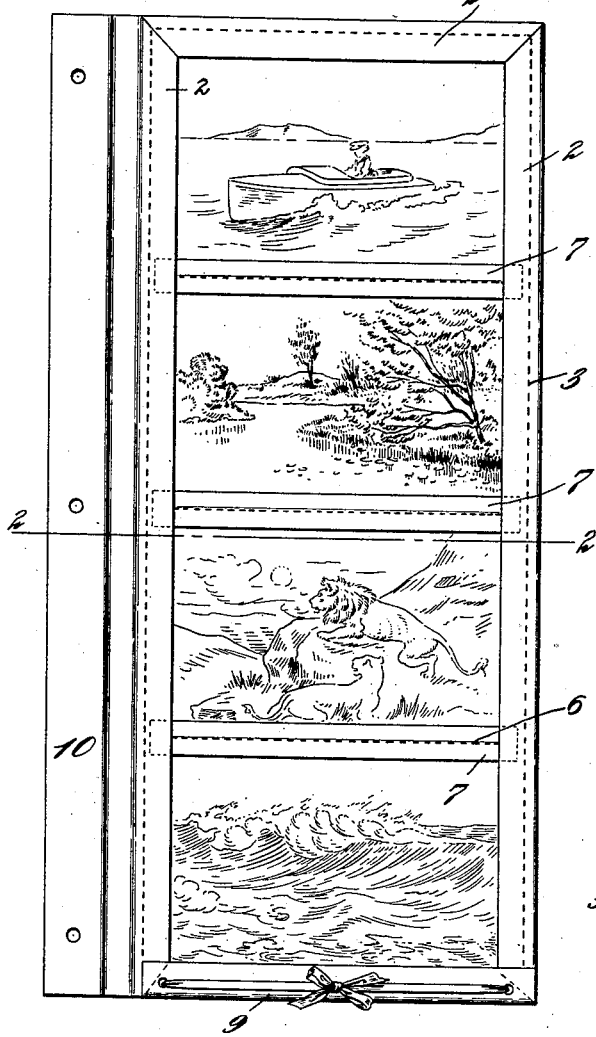
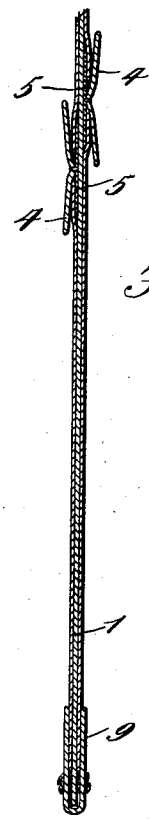
Witnesses:
Inventor
Frederic E. Kip
By his Attorneys
Gifford & Bull

UNITED STATES PATENT OFFICE.

FREDERIC E. KIP, OF MONTCLAIR, NEW JERSEY.

PHOTOGRAPH-HOLDER.

1,024,583.   Specification of Letters Patent.   Patented Apr. 30, 1912.

Application filed August 5, 1910. Serial No. 575,712.

*To all whom it may concern:*

Be it known that I, FREDERIC E. KIP, a citizen of the United States, residing at Montclair, in the county of Essex and State of New Jersey, have invented certain new and useful Improvements in Photograph-Holders, of which the following is a specification.

My invention relates to a photograph holder and will be understood by reference to the accompanying drawings in which—

Figure 1 is a plan view of the holder in the form of a leaf which may be bound in a volume; Fig. 2 a transverse section on the plane of the line 2—2 of Fig. 1; Fig. 3 a longitudinal section on an enlarged scale of the lowermost section of the holder; and Fig. 4 a view in perspective of the retainer adapted for insertion between the photographs.

The holder herein illustrated consists of a frame comprising a base 1 of cardboard, or other suitable material, having stitched at the top and sides a binding 2 preferably of leather. The line of stitches 3 is placed comparatively close to the edge of the base so as to leave the portion of the binding inside of the line of stitches free to receive the ends of the photographs. The frame may be of any desired length and width to hold photographs of a standard size. In Fig. 1 I have shown the frame as containing four photographs of the same size, and to retain them securely in the frame I provide a slidable retainer 7. This, as shown in the drawings, consists of two strips 4 and 5 of leather or card-board secured together in any suitable manner, as by a line of central longitudinal stitches 6 to form pockets in opposite sides of the line of stitches. As shown in Fig. 4, the retainers may be opened out longitudinally to receive the sides of the photograph and, when assembled, as shown in Fig. 1, the photographs will be firmly held in position with the edges fully protected. Thus, referring to Fig. 1, the upper photograph will be inserted by placing the side edges beneath the free portions of the binding 2 and slid into position with its upper edge beneath the upper free edge of the binding. A retainer 7 is then inserted by placing its edges beneath the free edge of the binding, and the lower edge of the photograph inserted between the sections 4 and 5 of the retainer. When the next photograph is placed in the holder its upper edge is slipped between the two sections 4 and 5 of the retainer on the side of the line of stitches opposite to that between which the uppermost photograph is inserted. A second retainer 7 for the lower edge of the second photograph is then inserted, and so on until the holder is filled. After the last photograph has been placed in position the lower end of the frame may be closed by a detachable retainer 9 which may be secured to the frame by a ribbon or other suitable means.

If the holder is to be used as a loose leaf to be inserted into a binder, the left-hand binding strip 2 may form part of, or may be secured to, a marginal strip 10 adapted for insertion between covers, as is usual in loose leaf binders.

The under side of each holder is adapted to receive the photographs in the manner above described, and as indicated in Figs. 2 and 3.

While I have described the device as a holder for photographs, I desire to include within such title picture postals, pictures, advertising cards, and the like. Also, while I have described the binding as of leather, I do not restrict myself to any particular material, provided it is stiff enough to stand the necessary handling and to hold the edges of the photograph or card. It is desirable that the retainers which cover the edges of contiguous photographs should be of the same material as the binding, but the under sections 5 of the retainers, which are not exposed, may be of different or cheaper material than the exposed sections 4.

The present invention provides an efficient form of holder in which photographs, or cards, may be attractively arranged and preserved without the use of paste. The end edges of the photographs or cards are thoroughly protected by the binding 2 fastened to the base 1, and the side edges are covered by the retainers 7. The prints or cards may be inserted until the frame is filled on both sides, when it may be bound in a volume with others, following the loose leaf system.

The ends of the retainers 7 are held securely in position by the binding 2, and by having them unsecured by any other means the holder is adapted to receive photographs or cards of varying widths, the only essential for a given holder being that the prints or cards shall be of the same length.

Instead of placing the prints as shown in Fig. 1, they may be placed extending longitudinally of the holder, the latter being made of such length as to receive a given number of prints or cards of standard size. In either arrangement; that is, crosswise or lengthwise of the holder, each print or card will be attractively framed by the binding and the separating strips or retainers.

While I have shown only one vertical row of photographs, it is obvious that the holder may be made of such width as to accommodate two or more vertical rows. In such case the long vertical strip 2 between the vertical rows will be opened along both edges to receive the side edges of the photographs.

By the word "photograph" used in the foregoing specification I intend to include all similar prints as pictures, cards, or prints of any character.

What I claim and desire to secure by Letters Patent of the United States is:—

1. A device of the character described comprising a frame having a binding with its inner edges free and under which the edges of a photograph or card may be placed, a flat retainer having pockets to receive and hold the edges of contiguous photographs or cards, said retainer being slidably attached to the frame.

2. A device of the character described comprising a frame having a binding with its inner edges free and under which the edges of a photograph or card may be placed, a flat retainer consisting of two sections fastened together along a longitudinal line to form pockets to receive and hold the edges of contiguous photographs or cards, said retainer being slidably attached to the frame.

3. A device of the character described comprising a frame having a binding with its inner edges free and under which the edges of a photograph or card may be placed, and a movable retainer adapted to be inserted between and to cover contiguous edges of the photographs or cards and to slide between said binding and frame.

In testimony whereof I have hereunto signed my name in the presence of two subscribing witnesses.

FREDERIC E. KIP.

Witnesses:
CHARLES S. JONES,
C. G. HEYLMAN.

Copies of this patent may be obtained for five cents each, by addressing the "Commissioner of Patents, Washington, D. C."